United States Patent [19]

Payne et al.

[11] Patent Number: 4,497,536
[45] Date of Patent: Feb. 5, 1985

[54] COUPLING OF DIELECTRIC OPTICAL WAVEGUIDES

[75] Inventors: David B. Payne, Wickham Market; Colin A. Millar, Stowmarket, both of England

[73] Assignee: Post Office, London, England

[21] Appl. No.: 497,219

[22] Filed: May 27, 1983

Related U.S. Application Data

[63] Continuation of Ser. No. 166,891, Jul. 8, 1980, abandoned.

[30] Foreign Application Priority Data

Jul. 9, 1979 [GB] United Kingdom ............... 79.23817
Nov. 5, 1979 [GB] United Kingdom ............... 79.38194

[51] Int. Cl.³ .............................................. G02B 7/26
[52] U.S. Cl. .............................. 350/96.21; 350/96.18
[58] Field of Search ............... 350/96.18, 96.20, 96.21, 350/96.22, 96.23

[56] References Cited

U.S. PATENT DOCUMENTS

| 4,087,155 | 5/1978 | Deacon | 350/96.21 |
|---|---|---|---|
| 4,109,994 | 8/1978 | Chown | 350/96.21 |
| 4,130,345 | 12/1978 | Doellner | 350/96.22 |
| 4,135,781 | 1/1979 | Archer | 350/96.20 |
| 4,191,447 | 3/1980 | Borsuk | 350/96.20 |
| 4,256,365 | 3/1981 | Lemesle et al. | 350/96.18 |
| 4,265,511 | 5/1981 | Nicia et al. | 350/96.18 |
| 4,327,963 | 5/1982 | Khoe et al. | 350/96.18 |
| 4,370,021 | 1/1983 | Khoe et al. | 350/96.18 |

FOREIGN PATENT DOCUMENTS

| 2330022 | 5/1977 | France | 350/96.18 |
|---|---|---|---|
| 45938 | 4/1977 | Japan | 350/96.18 |
| 4044 | 1/1980 | Japan | 350/96.20 |

*Primary Examiner*—John Lee
*Attorney, Agent, or Firm*—Kemon & Estabrook

[57] ABSTRACT

A technique for aligning and coupling dielectric optical waveguides comprises threading the end of a waveguide through the central opening of a triad ball connector and forming by fusion a generally spherical glass bead on the end of the waveguide using, for example, an electric arc. The waveguide is then drawn back so that the bead contacts the balls of the triad connector to accurately locate the waveguide. The bead acts as a locating element and also has beneficial focussing properties.

16 Claims, 13 Drawing Figures

COUPLING OF DIELECTRIC OPTICAL WAVEGUIDES

This application is a continuation of application Ser. No. 166,891, filed July 8, 1980, now abandoned.

DESCRIPTION

The present invention relates to aligning and coupling dielectric optical waveguides.

When joining together adjacent lengths of optical fibre, which typically has an overall diameter (core and cladding but excluding any plastics coating) of 150 microns or less, it is necessary for the two ends to be positioned relative to one another with great precision before the joint is made. Positioning is normally carried out by locating each fibre in a larger component, which must itself be accurately made. A further problem then arises in the precise alignment of the two larger components which must be effected by an alignment device of comparable accuracy.

In U.K. Patent Application No. 34677/77, now patent No. 1,595,208, there is described one example of a device for holding and/or aligning a dielectric optical waveguide which comprises a triad of mutually contacting spherical bodies of substantially equal radius, and bias means adapted to press the bodies towards one another.

In use of this device, the radius of the spheres and the radius of a dielectric optical waveguide to be held by the triad should be matched so that the generally circular section of the fibre occupies the region of a circle inscribed within the triad of spheres. The fibre is then a snug but sliding fit in the central interstice of the triad. The size of the central interstice depends only on the radius of the spheres and can be determined with a relatively high degree of accuracy.

In using the device to join two fibres, two of the devices are used to bring two fibre ends into the correct mutual position. In order to position two fibres accurately with respect to one another prior to joining, it is necessary to provide some means for maintaining the two devices on a common axis. This can be effected simply by enclosing the two individual alignment devices in a common tube or sleeve in which they are a sliding fit. The common tube or sleeve may, for example, be made of plastics material.

We have developed a technique for aligning and coupling optical fibres which involves forming a glass bead on the end of each fibre to be coupled during their location in a coupling device. The technique has been developed in conjunction with the triad type alignment device described above although it can be used with many other types of coupling device.

According to one aspect of the present invention there is provided a method of coupling and aligning dielectric optical waveguides which includes locating an optical waveguide to be coupled in a coupling element of a coupling device, forming a bead on the end of the waveguide and moving the waveguide so that the bead contacts a locating surface on the coupling element whereby the bead acts as a locating element.

According to another aspect of the present invention there is provided a dielectric optical waveguide coupling comprising first and second coupling elements each supporting a dielectric optical waveguide so that the axes of the waveguides are aligned, and wherein each waveguide has a bead formed on the end thereof which bead locates against a locating surface on its associated coupling element.

In using the technique with the triad type device an optical fibre is threaded through the central interstice of the triad, a bead is formed on the end of the fibre and the fibre is positioned such that the bead contacts the three spherical bodies of the triad. The provision of the bead enables the fibre to be located more accurately within the device than if the bead is not provided. In addition to the support provided within the central interstice the fibre is also supported at the position where the bead contacts the spherical bodies. The fibre thus becomes an alignment component and the arrangement effectively eliminates lateral displacement and angular offset of the fibre. In addition longitudinal location of the fibre is provided. Similar effects can be achieved with other types of connectors.

The bead can be formed by fusing a predetermined length of fibre using an electric arc. Alternatively the bead can be formed by flame fusion.

In addition to acting as a locator the bead has been found somewhat surprisingly to have a focussing characteristic which can have beneficial effects in a fibre coupling.

The invention will now be described by way of example only with reference to the accompanying drawings, in which.

Figure 1:
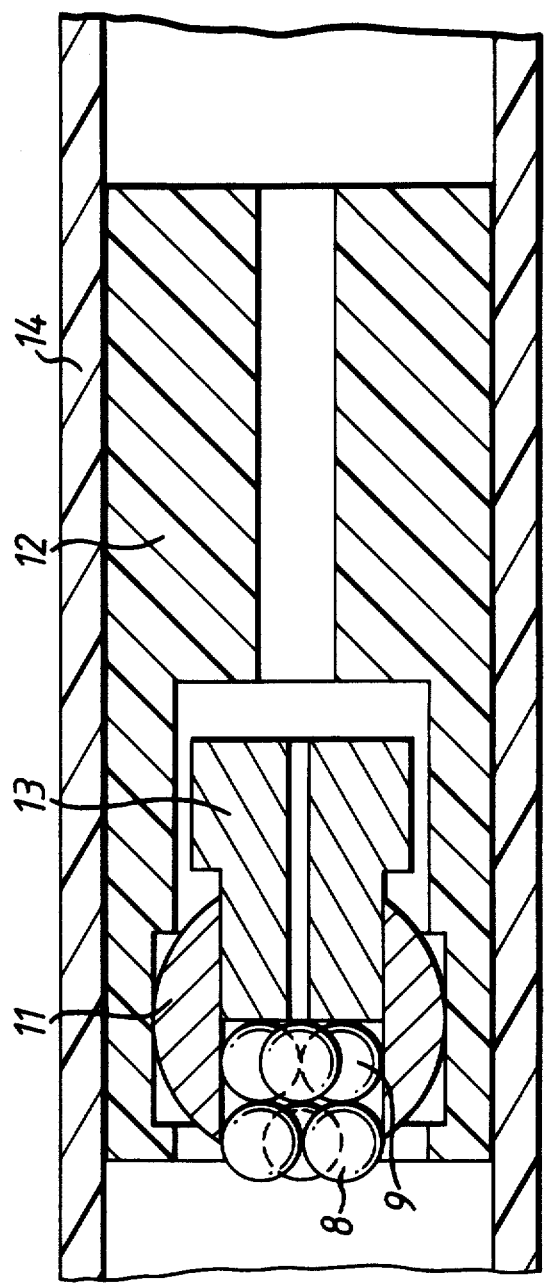
FIG. 1 is a schematic axial section through an alignment device described in U.K. Patent Application No. 34677/77; now patent No. 1,595,208.

Referring to FIG. 1 a triad type connector for coupling optical fibres comprises a main triad of tungsten carbide spheres 8 and a subsidiary triad of identical spheres 9 which are arranged in an inter-locking row and fitted tightly into a cylindrical passage bored through a stainless steel sphere 11 of larger radius. Although the triads 8 and 9 fit tightly into the larger sphere 11, each individual small sphere is free to rotate about its own centre. The larger sphere 11 is snap-fitted into a polytetrafluoroethylene moulding 12 having an axial bore of varying diameter. The end furthest from the main triad 8 of the passage through the larger sphere 11 is blocked by a plug 13 which restricts the freedom of the larger sphere 11 to rotate about its centre. The plug 13 is of brass and also has an axial bore to accommodate fibre. The moulding 12 is a sliding fit in an outer tube 14 of any suitable material, for example, transparent plastics material. When the device of FIG. 1 is to be used for fibre joining, two such devices are accommodated within a common holding tube 14 with their main triads 8 adjacent to one another. The two devices may be biassed towards each other by means of separate coil springs (not illustrated).

Typical dimensions of this device are as follows:

Diameter of smaller spheres: 0.845 mm (845 microns).
Diameter of larger sphere: 3.18 mm
Diameter of passage through larger sphere: 1.793 mm.
Diameter of larger portion of brass plug: 2.00 mm.
Diameter of bore through brass plug: 0.30 mm.
Outer diameter of PTFE moulding: 4.00 mm.
Diameter of bore through PTFE moulding (left to right): 3.00, 3.30, 3.00, 1.00 mm.
External diameter of holding tube: 5.00 mm.

Although FIG. 1 shows two triads it will be appreciated that one or three triads may also be used.

Figure 2:
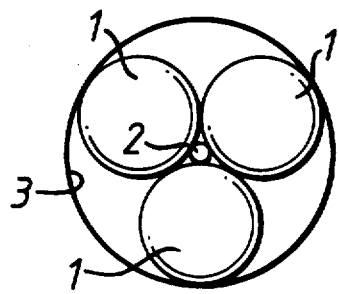
FIG. 2 is a schematic representation of a triad of spheres forming part of the device of FIG. 1.

FIG. 2 shows schematically how a fibre nests in a triad of mutually-contacting spheres 1 of equal radius. At the centre of the triad a dielectric optical waveguide (optical fibre) 2 occupies the region of an inscribed circle to the spheres 1 while a wall 3 of a surrounding passageway occupies the position of a circumscribing circle to the spheres 1. The fibre should be a snug but sliding fit within the triad at the site of the inscribed circle.

Typical dimensions of the components are related as follows:

Radius of sphere = A
Radius of inscribed circle = A (sec 30 − 1) = 0.1547A.
Radius of circumscribing circle = A (sec 30 + 1) = 2.1547A.
Radius of fibre = 62.5 microns, therefore A = 404 microns.
Required diameter of spheres = 808 microns.
Required internal diameter of surrounding passageway = 1.741 mm.

In practice, the sphere diameter must slightly exceed the calculated figure to allow for working clearance around the fibre and because the balls are slightly compressed by the wall of the surrounding passageway. Clearly, if a fibre of a radius different from 62.5 microns is used, a different sphere diameter must be chosen.

In practice, the radius of the wall 3 of the passageway would be stretched somewhat in circumscribing the spherical balls, such stretching providing the necessary inward force on the spherical balls.

Figure 3:
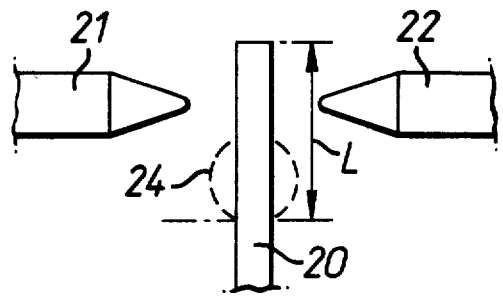
FIG. 3 is a schematic view illustrating a step in the present technique.
Figure 4:
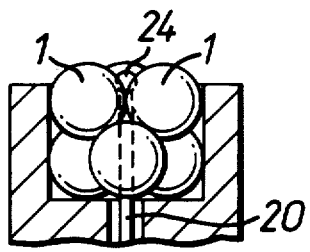
FIG. 4 is a schematic view of part of a triad type connector used with the present invention.

Referring to FIGS. 3 and 4 in one example of the present technique a fibre 20 which is to be coupled with a similar fibre, is threaded through the central interstice of a triad type alignment device. A length L of the fibre end is located between the electrodes 21, 22 of an electric arc. The arc is struck to cause the fibre end to melt and form into a glass bead as shown at 24. Formation is monitored using a micrometer eyepiece. The fibre is then drawn back so that the bead 24 locates against the three balls 1 of the triad as shown schematically in FIG. 4. It will be apparent that the fibre is supported at a position where it passes through the central interstice of the triad and also at a position where the bead 24 contacts the balls of the triad. These positions are axially spaced. The result of this is that lateral displacement of the fibre is almost entirely eliminated and the angular offset of the fibre which can occur is extremely small particularly when two juxtaposed triads are used. Also the fibre is located accurately longitudinally.

The radius of the bead on the end of the fibre is given by $$(\tfrac{3}{4} r^2 L)^{\frac{1}{3}}$$

where r is the fibre radius and L the length of the fibre which is fused. Thus knowing the required bead radius it is possible to evaluate the length of the fibre to be fused. The exact positioning of the fibre between the arc electrodes in order to produce fusing of this length can be determimed by a simple calibration procedure. When fusing the fibre end it is preferred that the fibre axis be substantially vertical and that the fibre be fed upwards towards the electrodes. A typical bead diameter is 180$\mu$.

Typically the arc is an a.c. arc with an arc current of 20 ma at 500 Volts for a period of approximately 4 secs. The diameter of the bead can be controlled to about 2$\mu$.

As an alternative to the above procedure the arc can be struck several times with the fibre being stepped upwardly each time the arc is struck. In this case the duration of each arc is of the order of 2 secs. This procedure is suitable for monomode fibres.

Figure 5:
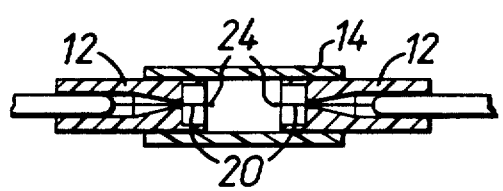
FIG. 5 is a schematic view of a triad type connector incorporating the present invention.

When two fibres are to be joined using two devices of the type shown in FIG. 1, a bead is formed on the end of each fibre as described above. The two devices are located in a common sleeve 14 so that glass beads on the fibre end are facing each other along the axis 5 as shown schematically in FIG. 5. Typically the spacing between the beads is 160$\mu$-200$\mu$.

In the arrangement described above the fibre is a tight fit in the gap between the balls. It is envisaged that it is possible to use a ball connector in which the ball diameters are greater than that required for a tight fit on the fibre and to employ a slightly larger bead on the fibre end.

It will be appreciated that the fibre becomes an alignment component when the present technique is used. It is possible to produce the bead simply and quickly with accurately determined dimensions. The completed connector has relatively low loss—less than 1 dB. Also as the beads of a completed coupling are separated there is little chance of damage being caused to the fibre ends.

In addition to its location function the bead also acts as a refracting spherical lens with focussing properties. This has been confirmed by theory and observation which indicate that for monomode fibres losses of about 1 dB or less can be achieved. Losses are expected to be less for multimode fibres.

Measurements of alignment tolerances also demonstrate the effect of the beads. It has been found that the beads enhance the performance of a connector when misalignment of fibres occurs.

A connector using the bead technique is relatively easy to assemble in the field. In addition to its focussing properties the bead acts as a location element. Furthermore the spherical fibre ends provided by the beads reduce end reflection of light back towards a light source. Also the connector is less sensitive to vibration and thermal effects.

The description so far has considered the bead technique in connection with a triad ball-type connector. The bead technique is not limited to use with such a connector and examples of other connectors with which the technique can be used will be described now.

Figure 6:
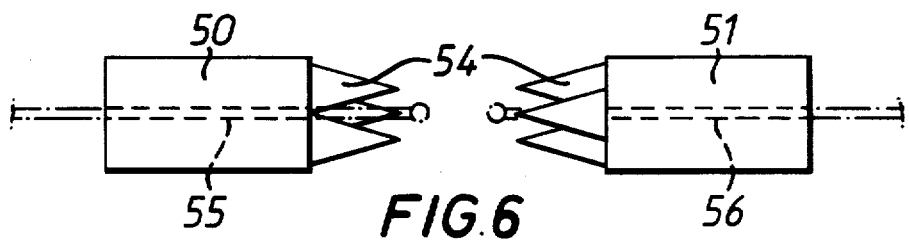
FIGS. 6 to 9 illustrate other types of connectors with which the bead technique can be used.

Referring now to FIG. 6 there is illustrated a tapered rod type connector which can also be used with the bead technique. The connector comprises two cylindrical carriers 50, 51 from each of which project tapered rods 54. Each carrier 50, 51 has an axial bore 55, 56 which opens into the central interstice of the rods 54. The method of connection is substantially similar to that described with reference to FIGS. 4 and 5, the bead when formed being drawn back to locate against the surface of the tapered rods 54. An important consideration with this type of connector is the taper angle of the rods. This depends on the dimension of the bead and the rod radius. It is found that the taper angle of the rods should be of the order of 30° when $$r_b/a = 0.25$$

where $r_b$ = bead radius, and a = rod radius.

Figure 7:
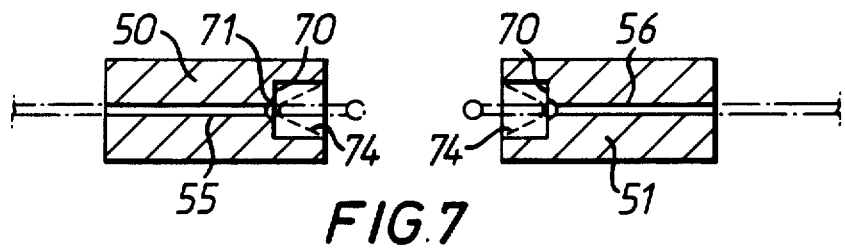

Referring to FIG. 7 the technique can be used with a ferrule type coupling where the surface 70 of the ferrule is rounded as shown at 71 adjacent the mouth of the bore 55, 56 to accommodate the bead which has been formed on the fibre. The diameter of bore 55, 56 in the ferrule which accommodates the fibre need not be accurate but obviously must not be greater than the diameter of the bead. The bead can be recessed into the ferrule with precision and as it is a point location rather than a length location it may be simpler to machine.

In a modification of the FIG. 7 arrangement, each ferrule may have a conical recess as shown by dotted line 74 in FIG. 7. In the completed connector the bead locates within the apex of the conical recess.

Figure 8:
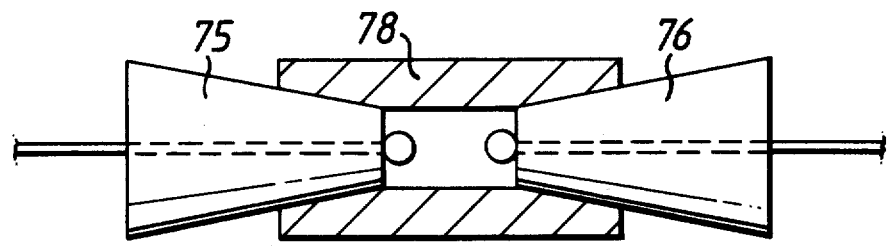

FIG. 8 illustrates a conical type coupling device comprising a pair of frustoconical connector elements 75, 76 which are arranged to be located within a cylindrical sleeve 78, opposite ends of which are shaped internally to mate with the circumference of the elements 75 and 76. The conical elements 75 and 76 can be moulded or machined.

Figure 9:
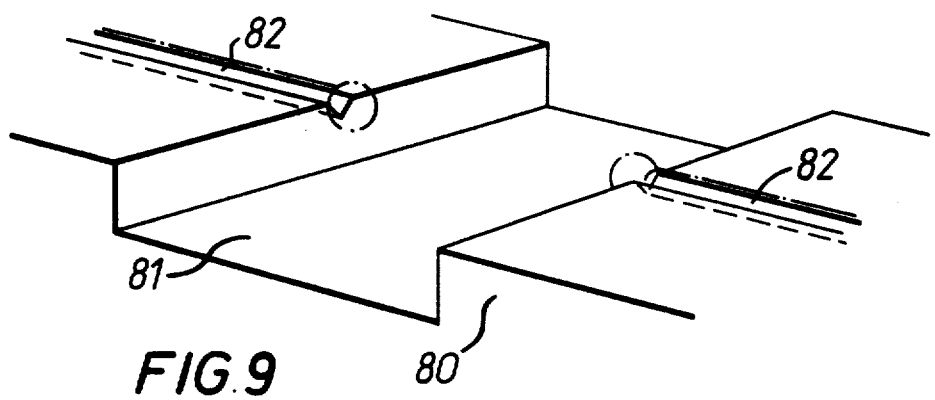

In FIG. 9 there is shown a V-groove type coupling device used with the bead technique. The coupler comprises a base element 80 in which is formed a well 81. The upper surface of the base element on opposite sides of the well has a machined V-groove 82. The fibres to be joined are located one in each part of the V-groove and after the bead has been formed the fibres are drawn back against the walls of the well as shown in FIG. 9. The V-groove can be pressed, machined or etched from a continuous pattern. The two halves of the groove should be in alignment over the well with the bead sitting at the edge of the relevant V-groove and the dimensions of the well being selected to provide the optimum separation between the beads.

Figure 10:
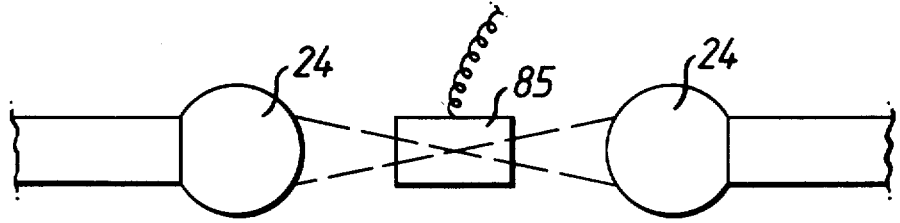
FIGS. 10 and 11 illustrate other possible applications of the bead technique.
Figure 11:
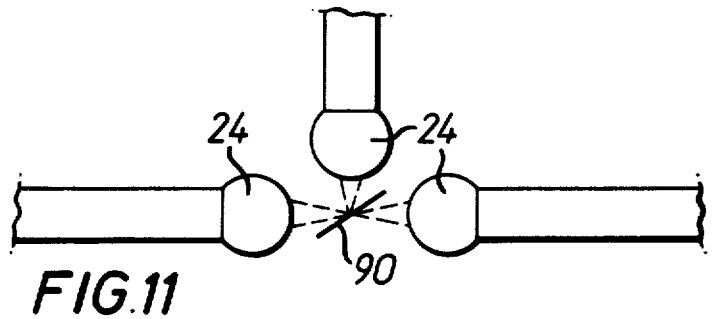

FIGS. 10 and 11 illustrate other envisaged applications of the bead type coupling. FIG. 10 illustrates the use of a modulator 85 in the gap between the beads. The modulator can be an electro-optic crystal or other suitable modulator. FIG. 11 illustrates how three fibres can be interconnected to provide power splitting using a partially reflecting surface 90 with light from one fibre being divided into two other fibres.

Figure 12:
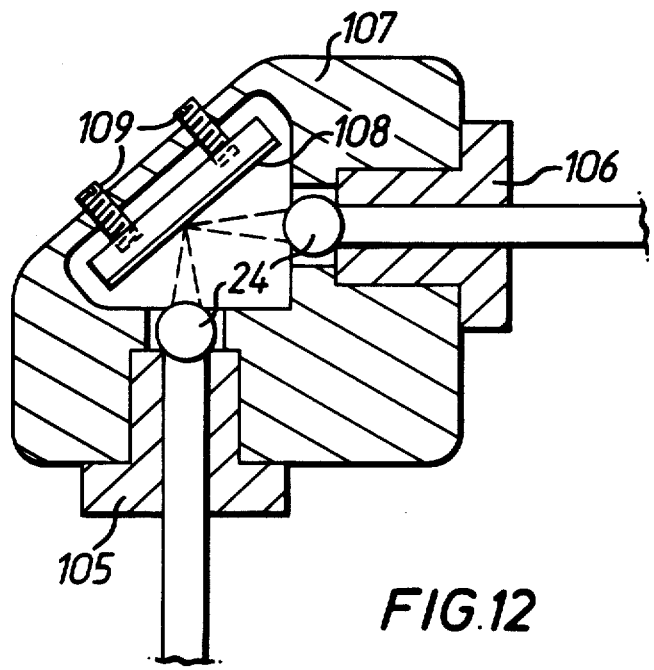
FIGS. 12 and 13 illustrate two further connectors with which the bead technique can be used.

The present technique is not limited to in-line type coupling devices. Referring to FIG. 12 it is possible to couple two fibres which have their axes located at 90°. The beads are produced in the manner described earlier after the fibres have been located in coupling elements 105, 106. The coupling elements are then located in a housing 107 so that the axes of the fibres lie at 90° to each other. Light from one fibre is directed towards the other fibre by way of a mirror 108 disposed at 45° to the axis of each fibre. The position of the mirror 108 can be adjusted by adjusting screws 109 to give optimum coupling.

Figure 13:
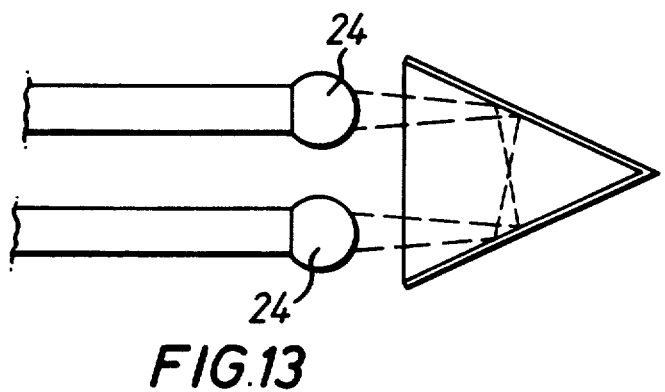

FIG. 13 illustrates how the technique can be used in a similar manner to produce a 180° connector.

We claim:

1. An optical waveguide coupling assembly comprising a plurality of coupling elements, wherein the coupling elements each have a groove therein, each of which grooves slidably supports a waveguide, the arrangement being such that the axes of the waveguides lie in a common plane, and wherein each waveguide has a bead integral with its end, the surface of the bead which lies towards the waveguide being in contact with a locating surface on the respective coupling element such that axial movement of each waveguide in one direction only is restricted thereby with axial movement in the direction opposite to said one direction being unrestricted.

2. An optical waveguide coupling assembly according to claim 1 wherein the beads are spaced apart.

3. An optical waveguide coupling assembly according to claim 2 wherein there are provided two coupling elements and the axes of the waveguides lie at an angle of between 5° and 180° with respect to each other and a reflecting surface is provided such that, in use, optical power emitted from one of said waveguides is reflected by the surface to the other of said waveguides.

4. An optical waveguide coupling assembly according to claim 3 wherein the axes of the waveguides lie at an angle of 180° with respect to each other and the reflecting surface comprises a roof reflector.

5. An optical waveguide coupling assembly according to claim 1 wherein there are provided two coupling elements and the axes of the waveguides are aligned.

6. An optical waveguide coupling assembly according to claim 5 wherein the assembly further comprises an optical signal modulator, the modulator being positioned between the beads.

7. An optical waveguide coupling assembly according to claim 6 wherein the modulator comprises an electro-optic crystal.

8. An optical waveguide coupling assembly according to claim 1 comprising three coupling elements, the beads which are integral with the ends of the three associated waveguides being spaced apart, wherein the axes of two of the waveguides are aligned and a partially reflecting surface is provided between the beads of said two waveguides, the arrangement being such that, in use, optical power emitted from one of said two waveguides is partially transmitted by the surface to the other of said two waveguides and partially reflected to the third waveguide.

9. A method of precisely locating the end of a dielectric optical waveguide in a coupling element of a waveguide coupling device, including the steps of locating the waveguide in a groove in the coupling element such that the end of said waveguide projects from said groove, applying heat to the end of said waveguide such that the end of the waveguide fuses to form a bead, allowing said bead to solidify by cooling, and subsequently sliding said waveguide in a direction along the axis of the waveguide so as to reduce the projection of the waveguide from the groove until said bead contacts a locating surface on said coupling element whereby said bead acts as a locating element in the completed waveguide coupling.

10. A method as claimed in claim 9 wherein a second optical waveguide is precisely located in a second coupling element of said waveguide coupling device.

11. A method as claimed in claim 9 or claim 10 wherein each said coupling element includes at least one triad of balls defining a central interstice and each said groove comprises the central interstice of said triad with the waveguide extending through said interstice.

12. A method as claimed in claim 9 or claim 10 wherein each said coupling element includes a cylindrical body having an axial bore which constitutes said groove and three tapered rods extending axially from the body, said waveguide being located through said bore and said bead after being formed and allowed to solidify being located in the central interstice of said tapered rods.

13. A method as claimed in claim 9 or claim 10 wherein each said coupling element includes a cylindrical body having an axial bore which constitutes said groove and a hemispherical recess around the mouth of one end of said bore.

14. A method as claimed in claim 9 or claim 10 wherein each said coupling element has an axial bore constituting said groove, said bore opening into a conical recess at one end of said element, the surface of each said element defining the apex region of said conical recess constituting said locating surface.

15. A method as claimed in claim 9 or claim 10 wherein each said coupling element has a surface with an elongate groove in which said waveguide is located, said bead being located against the mouth of said groove.

16. A method as claimed in claim 9 or claim 10 wherein said heat is applied by means of an electric arc.

* * * * *